(12) United States Patent
Bacon et al.

(10) Patent No.: US 6,463,581 B1
(45) Date of Patent: Oct. 8, 2002

(54) METHOD FOR DETERMINING REACHABLE METHODS IN OBJECT-ORIENTED APPLICATIONS THAT USE CLASS LIBRARIES

(75) Inventors: David Francis Bacon, New York; Johannes C. Laffra, Yorktown Heights; Peter Francis Sweeney, Spring Valley; Frank Tip, Mount Kisco, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,177

(22) Filed: Dec. 14, 1998

Related U.S. Application Data (63) Continuation-in-part of application No. 08/723,058, filed on Oct. 3, 1996, now Pat. No. 6,041,179.

(51) Int. Cl.[7] .................................................. G06F 9/45
(52) U.S. Cl. ........................ 717/154; 717/116; 709/315
(58) Field of Search .............................. 717/1, 9, 4, 8, 717/10, 5, 100, 106, 108, 116, 124, 143, 146, 151–161, 162–167, 136–142; 707/3, 103, 103 R; 709/315

(56) References Cited

U.S. PATENT DOCUMENTS

| | | | | | |
|---|---|---|---|---|---|
| 5,421,016 A | * | 5/1995 | Conner et al. | ............... | 717/146 |
| 5,966,539 A | * | 10/1999 | Srivastava | ................... | 717/156 |
| 5,983,020 A | * | 11/1999 | Sweeney et al. | ............ | 717/141 |
| 5,983,021 A | * | 11/1999 | Mitrovic | ..................... | 717/158 |
| 6,041,179 A | * | 3/2000 | Bacon et al. | ............... | 717/116 |
| 6,085,035 A | * | 7/2000 | Ungar | ......................... | 717/116 |

* cited by examiner

Primary Examiner—Gregory Morse
Assistant Examiner—Hoang-Vu Antony Nguyen-Ba
(74) Attorney, Agent, or Firm—F. Chau & Associates, LLP (57) ABSTRACT

The present invention analyzes an application A and computes a set reachable methods in A by determining the methods in A that may be called from another reachable method in A, or from within a class library L used by A without analyzing the classes in L.

The invention may be used as an optimization to reduce application size by eliminating unreachable methods. In the alternative, the invention may be used as a basis for optimizations that reduce execution time (e.g., by means of call devirtualization), and as a basis for tools for program understanding and debugging.

29 Claims, 5 Drawing Sheets

```
[39]  procedure processMethod(Method m);
[40]  begin
      /* add new instantiated classes to newClasses */
[41]    for each class C instantiated at a reachable location in m do
[42]      if C is not a library class and C does not occur in
              processedClasses, currentClasses, or newClasses then
[43]        add C to newClasses;
[44]      end if
[45]    end for
      /* add new directly called methods to newMethods */
[46]    for each reachable direct call to method A.f() in m do
[47]      if A is not a library class and A.f() does not occur in
              processedMethods, currentMethods, or newMethods then
[48]        add A.f() to newMethods;
[49]      end if
[50]    end for
      /* add new virtually called methods to newSignatures */
[51]    for each reachable virtual call to method B.g() in m do
[52]      if B is not a library class and B.g() does not occur in
              processedSignatures, currentSignatures, or newSignatures then
[53]        add B.g() to newSignatures;
[54]      end if
[55]    end for
[56]  end procedure;

[57]  procedure processCallSite(CallSite A.f(); ClassSet S);
[58]  begin
[59]    for each class C in S do
[60]      if C = A or C is transitively derived from class A then
[61]        let B.f() be the method that a dynamic dispatch to A.f() resolves to
              for a receiver expression of type C;
[62]        if B is not a library class and (B.f() does not occur in
                processedMethods, currentMethods, or newMethods) then
[63]          add B.f() to newMethods;
[64]        end if
[65]      end if
[66]    end for
[67]  end procedure;

[68]  procedure handleOverriddenLibraryMethods(ClassSet S);
[69]  begin
[70]    for each class C in S do
[71]      for each library interface class L from which C directly or indirectly inherits do
[72]        for each virtual method f() in L do
[73]          let B.f() be the method that a dynamic dispatch to L.f() resolves to
                for a receiver expression of type C;
[74]          if (B is not a library class and
                B.f() does not occur in processedMethods, currentMethods, or newMethods) then
[75]            add B.f() to newMethods;
[76]          end if
[77]        end for
[78]      end for
[79]    end for
[80]  end procedure;
```

```
[1]  class Example1 {
[2]     public static void main(String arg[]){
[3]        I i = new A();
[4]        i.f();
[5]        i.g();
[6]        i = new B();
[7]        i.f();
[8]        i.g();
[9]     }
[10] };
[11] interface I {
[12]    public void f();
[13]    public void g();
[14]    };
[15] };

[16] class A implements I {
[17]    public void f(){ ... };
[18]    public void g(){ ... };
[19] };

[20] class B extends A {
[21]    public void f(){ ... };
[22] };
```

FIG. 3

```
class L {
    void L(){ ... };           // constructor for class L
    void f(){ ...; this.h(); ... };   // virtual call to L.h()
    void h(){ ... };
};

class A extends L {
    void A(){ ...; L(); ... };        // constructor for class A, direct call to L.L()
    void h(){ ... };
    void g(){ ...; this.h(); ... };   // virtual call to A.h()
};

class B extends A {
    void B(){ ...; A(); ... };        // constructor for class B, direct call to A.A()
    void h(){ ...; this.k(); ... };   // virtual call to B.k()
    void g(){ ... };
    void k(){ ... };
};

class C {
    public static int main(String argv[]){
        A a = new B();        // instantiate B, direct call to B.B()
        a.f();                // virtual call to L.f()
        a.g();                // virtual call to A.g()
        return 0;
    }
};
```

FIG. 4

```
[1]   procedure findReachableMethods();
[2]   begin
      /* initialization */
[3]       processedClasses = the empty set;
[4]       currentClasses = the empty set;
[5]       newClasses = the empty set;
[6]       processedMethods = the empty set;
[7]       currentMethods = the set of initially reachable methods;
[8]       newMethods = the empty set;
[9]       processedSignatures = the empty set;
[10]      currentSignatures = the empty set;
[11]      newSignatures = the empty set;

/* main loop of the iteration */
[12]      while ( currentMethods is not empty or currentSignatures is not empty or currentClasses is not empty ) do /* Process current methods */
[13]          for each method m in currentMethods do
[14]              call processMethod(m);
[15]          end for /* Reprocess processed call sites w.r.t. current classes. This is necessary because additional
             targets of virtual calls may be found as additional instantiated classes are determined. */
[16]          for each call site d.f() in processedSignatures do
[17]              call processCallSite(d.f(),currentClasses);
[18]          end for /* Process current callsites w.r.t. processed classes */
[19]          for each call site d.f() in currentSignatures do
[20]              call processCallSite(d.f(),processedClasses);
[21]          end for /* Process current callsites w.r.t. current classes */
[22]          for each call site d.f() in currentSignatures do
[23]              call processCallSite(d.f(),currentClasses);
[24]          end for /* Find reachable overridden library methods */
[25]          call handleOverriddenLibraryMethods(currentClasses);

/* Prepare for the next iteration */
[26]          add the elements of currentClasses to processedClasses;
[27]          currentClasses = newClasses;
[28]          newClasses = the empty set;
[29]          add the elements of currentMethods to processedMethods;
[30]          currentMethods = newMethods;
[31]          newMethods = the empty set;
[32]          add the elements of currentSignatures to processedSignatures;
[33]          currentSignatures = newSignatures;
[34]          newSignatures = the empty set;
[35]      end while

[36]      liveMethodDefinitions = processedMethods;
[37]      liveMethodSignatures = processedSignatures - processedMethods;
[38]  end procedure;
```

FIG. 5

```
[39]  procedure processMethod(Method m);
[40]  begin
         /* add new instantiated classes to newClasses */
[41]     for each class C instantiated at a reachable location in m do
[42]        if C is not a library class and C does not occur in
                   processedClasses, currentClasses, or newClasses then
[43]           add C to newClasses;
[44]        end if
[45]     end for
         /* add new directly called methods to newMethods */
[46]     for each reachable direct call to method A.f() in m do
[47]        if A is not a library class and A.f() does not occur in
                   processedMethods, currentMethods, or newMethods then
[48]           add A.f() to newMethods;
[49]        end if
[50]     end for
         /* add new virtually called methods to newSignatures */
[51]     for each reachable virtual call to method B.g() in m do
[52]        if B is not a library class and B.g() does not occur in
                   processedSignatures, currentSignatures, or newSignatures then
[53]           add B.g() to newSignatures;
[54]        end if
[55]     end for
[56]  end procedure;

[57]  procedure processCallSite(CallSite A.f(); ClassSet S);
[58]  begin
[59]     for each class C in S do
[60]        if C = A or C is transitively derived from class A then
[61]           let B.f() be the method that a dynamic dispatch to A.f() resolves to
                   for a receiver expression of type C;
[62]           if B is not a library class and (B.f() does not occur in
                      processedMethods, currentMethods, or newMethods) then
[63]              add B.f() to newMethods;
[64]           end if
[65]        end if
[66]     end for
[67]  end procedure;

[68]  procedure handleOverriddenLibraryMethods(ClassSet S);
[69]  begin
[70]     for each class C in S do
[71]        for each library interface class L from which C directly or indirectly inherits do
[72]           for each virtual method f() in L do
[73]              let B.f() be the method that a dynamic dispatch to L.f() resolves to
                      for a receiver expression of type C;
[74]              if (B is not a library class and
                      B.f() does not occur in processedMethods, currentMethods, or newMethods) then
[75]                 add B.f() to newMethods;
[76]              end if
[77]           end for
[78]        end for
[79]     end for
[80]  end procedure;
```

METHOD FOR DETERMINING REACHABLE METHODS IN OBJECT-ORIENTED APPLICATIONS THAT USE CLASS LIBRARIES

CROSS-REFERENCE TO RELATED APPLICATIONS

The present invention is a continuation-in-part of No. 08/723,058 filed Oct. 13, 1996 is now U.S. Pat. No. 6,041,179, commonly assigned to the assignee of the present invention, herein incorporated by reference in its entirety.

BACKGROUND OF THE INVENTION

1. Field of the Invention

The present invention generally relates to object-oriented programming (OOP), and in particular to OOP systems supporting the C++ and Java programming languages.

2. Background Description

Object-oriented programming languages provide a number of features such as classes, inheritance, multiple inheritance, and virtual inheritance. These object-oriented features have several advantages. Most importantly, they enable the creation of class libraries that can be reused in many different applications. Class libraries are typically shipped independently from applications that use them. Libraries are commonly shipped as a combination of the executable (object) code, in combination with the library's interface. In order to use a library, a client application calls functions specified in the library's interface, and includes (links) the library's object code. This model has the advantage that a library has to be shipped and installed only once, even when multiple applications use it. An additional benefit of this approach is that the library's source code need not be exposed: Only the library's external interface needs to be visible.

However, the unavailability of a library's source code complicates so-called whole-program analysis of its client applications, which rely on the availability of the complete source code of an application. In particular, the unavailability of a library's source code complicates the problem of determining which methods in the client application are "live" (i.e., possibly reached in some execution of the application, which is referred to below as being "reachable") or "dead" (i.e., never reached in any execution of the application). The source for this problem is related to the fact that certain methods in the application code may be called indirectly from within the (unavailable) library code by way of a virtual method dispatch.

The prior art has focused on the elimination of unused methods for programs that do not use class libraries. An example of such prior art is Srivastava, "Unreachable procedures in object oriented programming", ACM Letters on Programming Languages and Systems, 1(4), pp. 355–364, December 1992.

Therefore, there is a need in the art to provide a mechanism for identifying unused methods for programs that use class libraries without requiring access to the source code for such class libraries.

SUMMARY OF THE INVENTION

The problems presented above and the related problems of the prior art are solved by the present invention, method and apparatus for finding reachable methods in applications that use class libraries. The present invention analyzes an application A and computes a set of reachable methods in A by determining the methods in A that may be called from another reachable method in A, or from within a class library L used by A without analyzing the classes in L.

The invention may be used as an optimization to reduce application size by eliminating unreachable methods. In the alternative, the invention may be used as a basis for optimizations that reduce execution time (e.g., by means of call devirtualization), and as a basis for tools for program understanding and debugging.

BRIEF DESCRIPTION OF THE DRAWINGS

FIGS. 4 and 5 are pseudo-code illustrating a method for determining a set of reachable methods for an application that utilizes a class library according to the present invention.

DETAILED DESCRIPTION OF THE INVENTION

Figure 1:
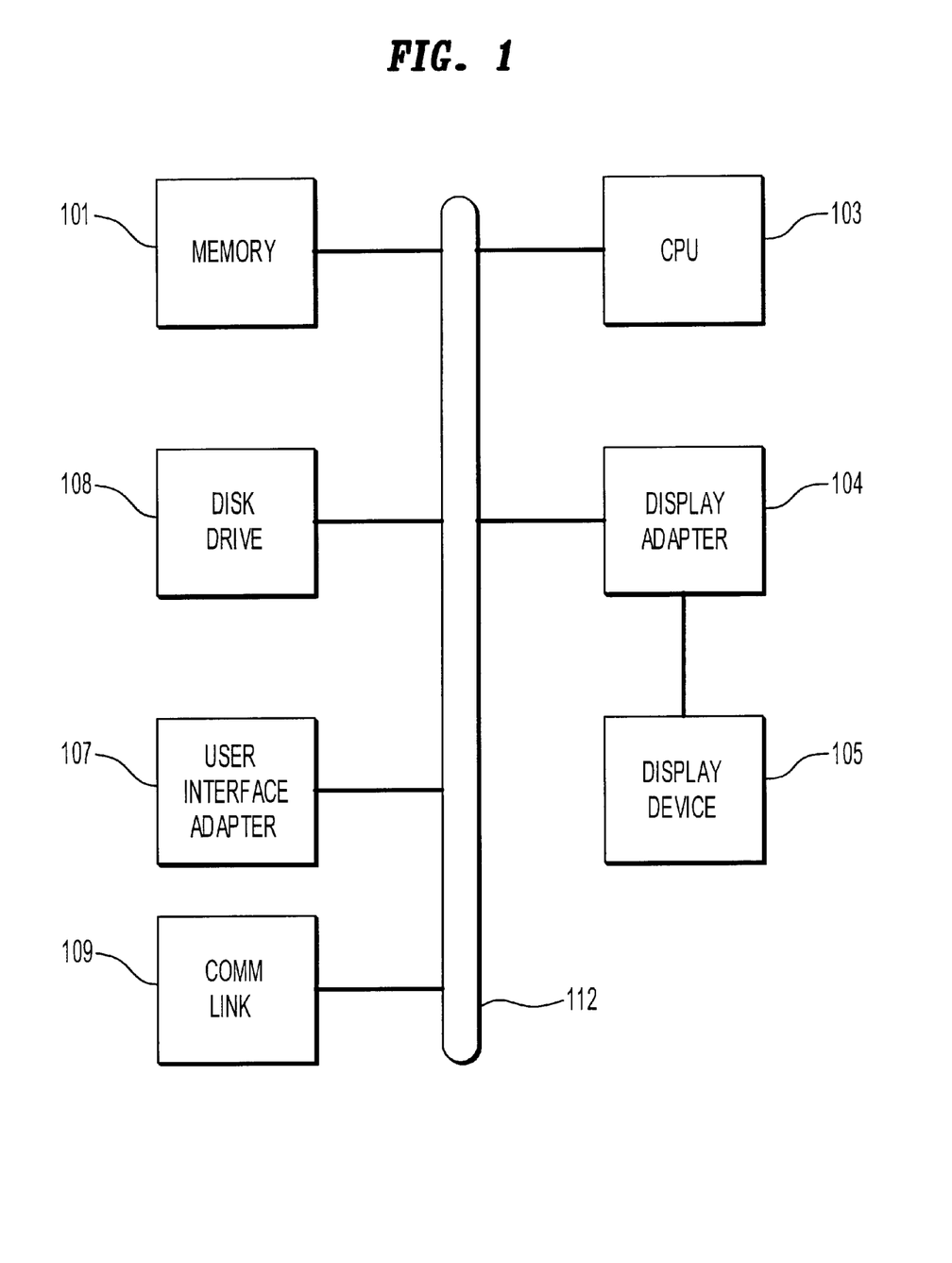
FIG. 1 is a block diagram illustrating a data processing system on which the subject invention may be implemented.

Referring now to the drawings, and more particularly to FIG. 1, there is shown a representative data processing apparatus on which the subject invention may be implemented. The computer processing apparatus includes memory 101 and a central processing unit (CPU) 103. The memory 101 typically includes main memory and cache memory for storing instructions to be executed by the CPU 103 and data to be used in the execution of such instructions.

The CPU 103 is attached via system bus 112 to user interface adapter 107. Typically, the user interface adapter 107 has attached to it a keyboard, a mouse, and/or other user interface. In addition, a display device 105 (such as a cathode ray tube display or a liquid crystal display) is connected to the system bus 112 via a display adapter 104.

The computer system's operating system (and other utilities), application program code and data are stored in persistent memory and temporarily loaded into memory 101 for execution by the CPU 103. The persistent memory is typically provided by a disk drive 108 coupled to the CPU via system bus 112. In addition, persistent memory may be provided by remote resources coupled to the CPU 103 via the system bus 112 and a communication link 109. In this case, portions of the computer system's operating system (or other utilities), and portions of the application program code and data may be retrieved from remote resources via the communication link 109 and loaded into memory 101 for execution by the CPU 103. The methodology of the present invention as described below is preferably implemented as application program code that is stored in persistent memory (or retrieved from remote resources) and loaded into memory 101 for execution by the CPU 103.

In order to better understand the invention, some background material is presented regarding the notions of class hierarchies and virtual method dispatch in object-oriented programming languages. The example programs discussed in this document are written in the Java programming language. For a definition of the Java language, refer to James Gosling, Bill Joy, and Guy Steele, "The Java Language Specification", Addison-Wesley, 1996. However, the invention also applies to other statically typed object-oriented programming languages such as C++.

The following aspects of class hierarchies are relevant for the present invention:

A class hierarchy contains a set of classes. Note that in some languages (e.g., Java) the term interface or abstract class is used to refer to a class whose functionality is restricted. Thus, a Java interface may be viewed as a class that cannot be instantiated, and which only specifies the signatures of the methods that it contains. Java interfaces can be treated as classes for the purposes of the method described in this document.

Each class in the hierarchy contains a set of members, which includes a set of (virtual) methods.

A class hierarchy contains a set of inheritance relations between classes. A class can extend the functionality of another class by deriving from it. The former class is referred to as the subclass or derived class, whereas the latter class is known as the superclass or base class. (Note that some languages, e.g., C++, allow a class to have multiple base classes).

Figure 2:
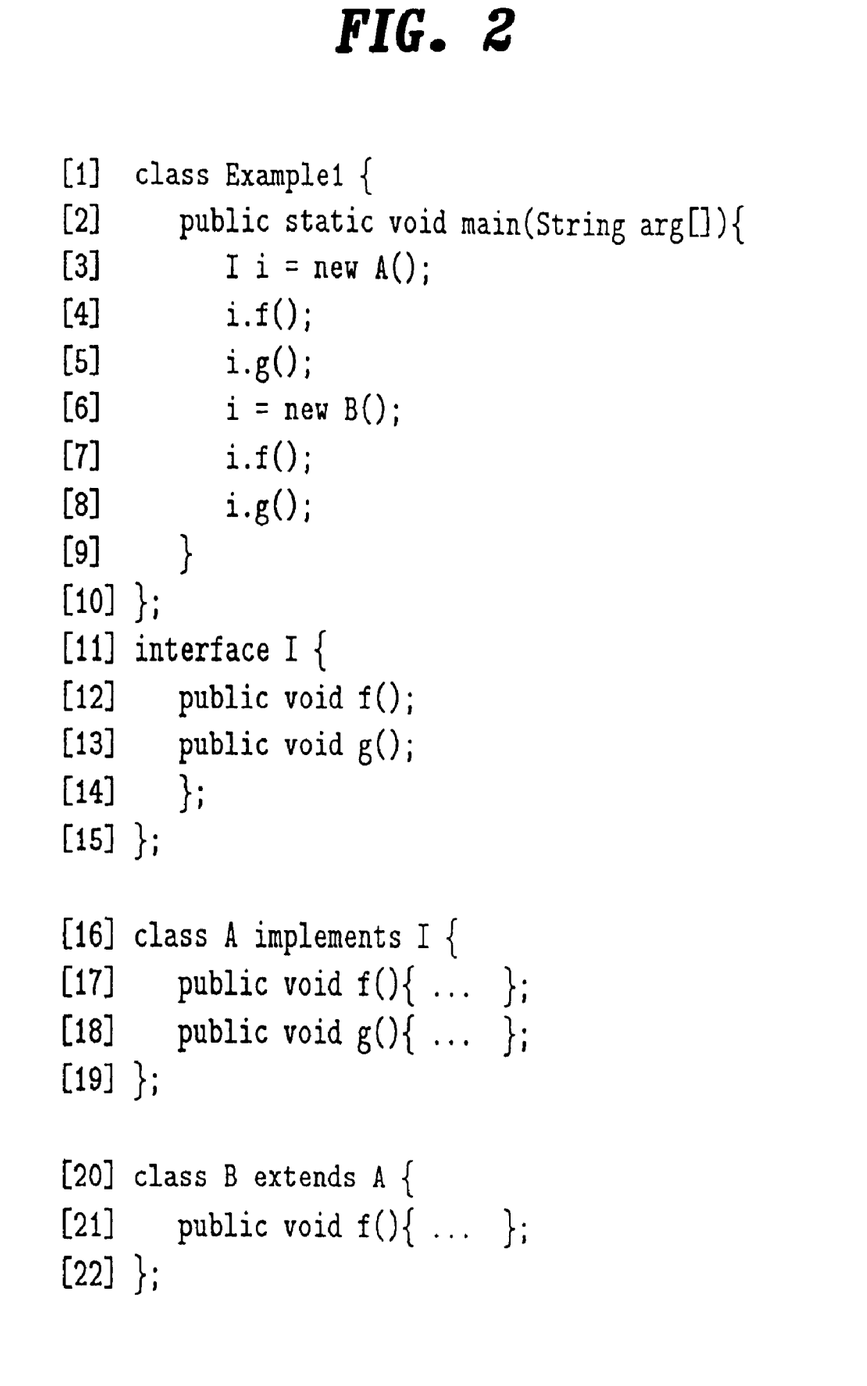
FIG. 2 is an exemplary application written in the Java programming language.

FIG. 2 shows a small Java application comprising an interface I, a class A that implements I, and a class B that extends A. Interface I specifies two methods, f( ) and g( ). Class A provides definitions (implementations) for methods f( ) and g( ), and class B provides an overriding definition for f( ) but not g( ).

The execution of line [3] of the program of FIG. 2 results in the creation of an A object, to which variable i is made to refer. Subsequently, on line [4] method f( ) is called on variable i. Since i points to an object of type A, this method call is dynamically dispatched to method A.f( ). Similarly, the call i.g( ) on line [5] is dynamically dispatched to A.g( ). After executing line [6], variable i refers to a newly allocated B-object. The call i.f( ) on line [7] dynamically dispatches to method B.f( ) because at that point i refers to an object of type B. However, note that the call i.g( ) on line [8] dispatches to A.g( ) because class B does not provide an overriding definition for g( ).

There are cases in which it is desirable to determine reachable methods in applications without analyzing the libraries used by these applications:

The code for the library may be unavailable, or only available in a form that is difficult to analyze (e.g., object code).

Different implementations of the library may exist. In such cases, reachable method analysis in the application should not depend on a particular version of the library.

A library may be too large to analyze exhaustively.

To address these issues, the method of the present invention determines a set of reachable methods in an application without analyzing class libraries used by the application.

For convenience, the term library class will henceforth be used to refer to classes that occur in a class library, and the term application class will be used to referred to classes that are not part of a class library. It is assumed that library classes do not inherit from application classes.

Figure 3:
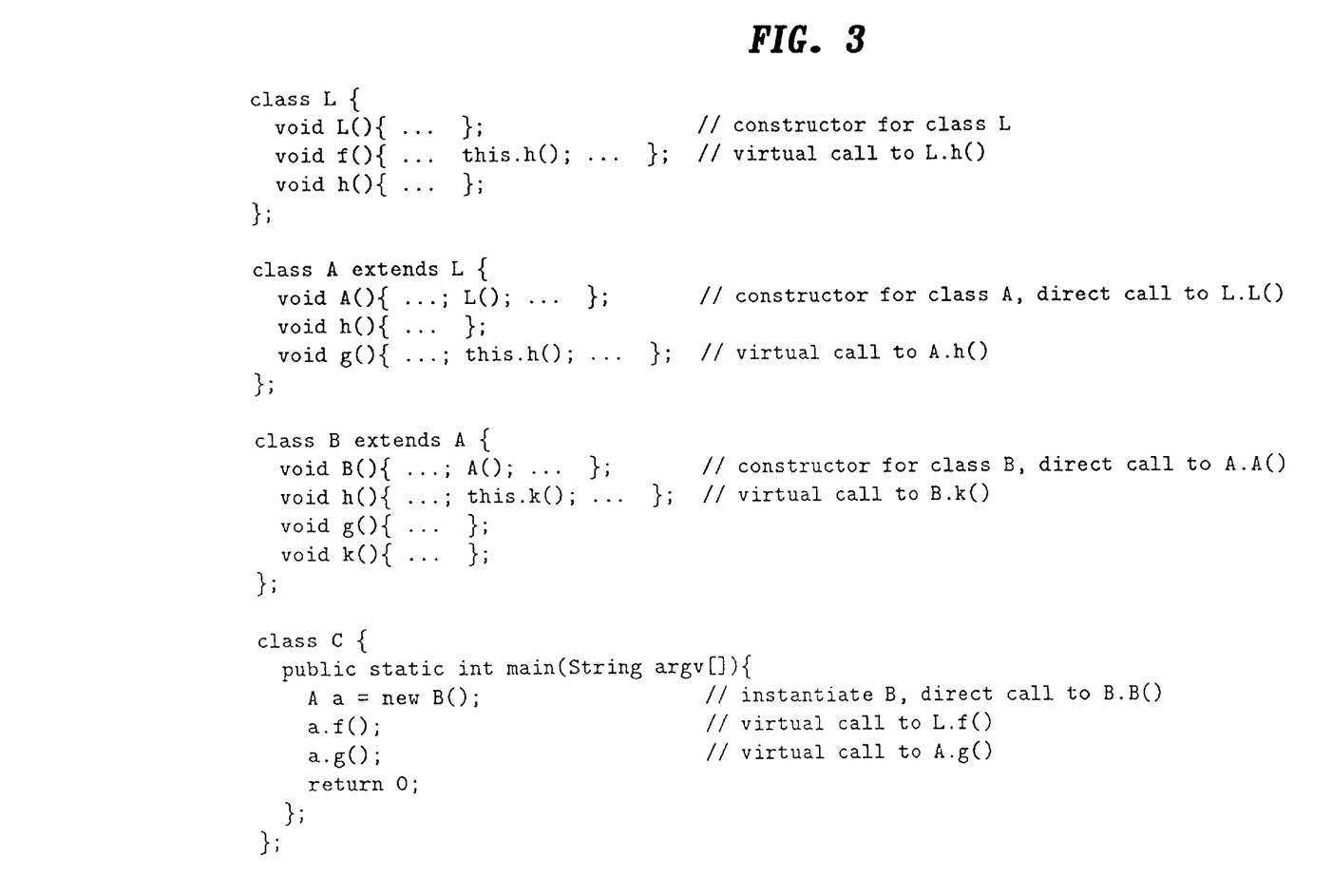
FIG. 3 is an exemplary application written in the Java programming language which makes use of a class library.

FIG. 3 shows a Java program that contains classes L, A, B, and C. It will be assumed that L is a library class that is not available for analysis. The program of FIG. 3 has the following characteristics:

Interface L specifies two methods,f( ) and h( ), as well as a constructor method L( ).

Class A is derived from L, overrides method h( ) and contains another method g( ) and a constructor method A( ). Method A.g( ) contains a virtual call to method A.h( ).

Class B is derived from A, and contains overriding definitions of methods g( ) and h( ), and a constructing method B( ). Class B also contains a method k( ). Method B.h( ) contains a call to method k( ).

Class C contains the main( ) method for this application. Method main( ) creates a B-object and assigns it to a variable α of type A. Then, method f is invoked on α, and subsequently method g( ) is invoked on α.

Consider the call this.h( ) in library method L.f( ). Since this method is called on an object whose run-time type B, the call will dispatch to method B.h( ). Hence, B.h( ) is a reachable method, even though the application contains no calls to any method h( ) outside the library.

The method of the present invention determines a set of reachable methods in an application that uses a class library without analysis of the code in the library. The method requires knowledge of the interface to the class library that includes the following:

the set of classes (and methods in those classes) that may be subclassed by the application, and the methods in the library classes that may be overridden by applications that use the library.

The method of the present invention uses this information to determine the methods in application code that may be invoked by dynamic dispatches in the library's code. The method comprises the following steps:

(1) Determining of a set of initially reachable methods. This set typically includes the application's main( ) method, and initialization methods for statically scoped or globally scoped variables.

(2) Processing a method. This involves the determination of a set of call sites in that method that may be executed, and a set of classes that may be instantiated in that method.

(3) Processing a call site. This involves the determination of a set of methods that can be reached from that call site by way of a dynamic dispatch.

(4) Determining the set of library methods that are overridden by the application, and that may be executed as a result of a dynamic dispatch in the library's executable code.

Steps (2),(3), and 4) are preferably performed repeatedly because a call site found in the course of performing Step (2) may lead to the determination of additional reached methods, and a method that is determined to be reachable in the course of performing Steps (3) or (4) may contain additional call sites, or instantiate additional classes.

FIGS. 4 and 5 illustrate in detail the preferred embodiment of the method of the present invention. We will now discuss the procedures of FIGS. 4 and 5 in detail.

Procedure findReachableMethods

The procedure findReachableMethods( ) (lines [1]–[38]) is the main procedure of the method for determining reachable methods in the presence of library usage. The method is iterative and relies on the following data structures:

processedClasses is a set of classes that have been determined to be instantiated, and with respect to which the call sites in set processedSignatures have been processed. Line [3] initializes processedClasses to be the empty set.

currentClasses is a set of classes that have been determined to be instantiated, and with respect to which the call sites in the sets currentSignatures and processedSignatures will be processed in the current iteration. Line [4] initializes currentClasses to be the empty set.

newClasses is a set of classes that are determined to be instantiated in the current iteration. In the next iteration, the call sites in processedSignatures and currentSignatures will be processed w.r.t. these classes. Line [5] initializes newClasses to be the empty set.

processedMethods is a set of methods that have been determined "reachable", and that are fully processed. Line [6] initializes processedMethods to be the empty set.

currentMethods is a set of methods that have been determined "reachable", and that will be processed in the current iteration. Line [7] initializes currentMethods to be the set of initially reachable methods. This includes the main method of the application as well as initializer methods for classes.

newMethods is a set of methods that are determined "reachable" in the current iteration, and that will be processed in the next iteration. Line [8] initializes newMethods to be the empty set.

processedSignatures represents a set of call sites to virtual methods that have been determined as "reachable". The call sites in processedSignatures have been resolved w.r.t. the classes in processedClasses. Line [9] initializes processedSignatures to be the empty set.

currentSignatures represents a set of call sites to virtual methods that have been determined as "reachable". The call sites in currentSignatures will be resolved w.r.t. the classes in processedClasses and currentClasses in the current iteration. Line [10] initializes currentSignatures to be the empty set.

newSignatures represents a set of call sites to virtual methods that are determined as "reachable" in the current iteration. These call sites will be resolved w.r.t. the classes in processedClasses and currentClasses in the next iteration. Line [11] initializes newSignatures to be the empty set.

Turning now to the procedure, lines [12]–[35] perform an iterative process that continues as long as one of the sets currentMethods, currentSignatures, or currentClasses is not empty. In lines[13]–[15], each reached method m in currentMethods is processed by a call to procedure processMethod. In lines [16]–[18], each reached call site d.f( ) in processedSignatures is processed w.r.t. the classes in set currentClasses, by a call to procedure processCallSite. In lines [19]–[21], each reached call site d.f( ) in currentSignatures is processed w.r.t. the classes in set processedClasses by a call to procedure processCallSite. In lines [22]–[24], each reached call site d.f( ) in currentSignatures is processed w.r.t. the classes in set currentClasses by a call to procedure processCallSite. In line [25], the set of overridden library methods w.r.t. the classes in set currentClasses is determined through a call to procedure handleOverriddenLibraryMethods.

Lines [26]–[34] are concerned with preparation for the next iteration. In lines [26]–[28], the elements of currentClasses are added to processedClasses and removed from currentClasses, the elements of newClasses are moved to currentClasses, and newClasses is set to the empty set. In lines [29]–[31], the elements of currentMethods are added to processedMethods and removed from currentMethods, the elements of newMethods are moved to currentMethods, and newMethods is set to the empty set. In lines [32]–[34], the elements of currentSignatures are added to processedSignatures and removed from currentSignatures, the elements of newSignatures are moved to currentSignatures, and newSignatures is set to the empty set.

After the iterative process has completed, the set liveMethodDefinitions of reachable methods consists of the set of methods in processedMethods (line [36]). In addition, the signatures of the methods that occur in processedSignatures but not in processedMethods are needed to ensure that method dispatches can be executed correctly (line [37 ]). For methods in the set liveMethodSignatures, only the signature (and not the body) is required for the execution of the program. For these methods, the body is preferably replaced by one or more statements that satisfy the type-checking requirements of the language (such as a return statement) such that compilation of the program does not result in an error and the size of the program representation is reduced.

Procedure processMethod

The procedure processMethod (lines [39]–[56]) processes a method m to determine if it contains (additional) reachable call sites, and/or if it instantiates (additional) classes.

In lines [41]–[45], the body of a method m is examined in order to determine if it contains any reachable class instantiation sites. Specifically, for each class C that is instantiated at a reachable location in m, it is determined if C is a library class, or if C already occurs in processedClasses, currentClasses, or newClasses (line [42]). If this is not the case, C is added to newClasses (line [43]).

Lines [46]–[50] are concerned with determining reachable direct (i.e., non-virtual) calls to other methods within method m. Specifically, for each reachable direct call to a method A.f( ), it is determined if A is a library class or if A.f( ) already occurs in processedMethods, currentMethods, or newMethods (line [47]). If this is not the case, method A.f( ) is added to newMethods (line [48]).

Lines [51]–[55] are concerned with determining reachable virtual calls to other methods within method m. Specifically, for each reachable virtual call site to a method B.g( ), it is determined if B is a library class or if B.g( ) already occurs in processedSignatures, currentSignatures, or newSignatures (line [52]). If this is not the case, method B.g( ) is added to newSignatures (line [53]).

The reachability of a (virtual or direct) call site, or a class instantiation site within a method can be determined using a variety of techniques. For instance, one can simply assume that all call sites that occur in a reached method are always reachable. Alternatively, one may use existing data flow analysis techniques (see e.g., A. V. Aho, R. Sethi, and J. D. Ullman, Compilers: Principles, Techniques and Tools', Addison-Wesley, 1986) to determine a more precise approximation of the set of call sites that can reached.

Procedure processCallSite

The procedure processCallSite (lines [57]–[67]) processes a virtual call site A.f( ) with respect to a set of instantiated classes S, and determines a set of (additional) methods that may be reached from that call site.

Lines [59]–[66] describe a loop over all classes C in set S. Line [60] determines if class C is equal to class A, or is derived from class A. If this is the case, the steps on lines [61]–[64] will be performed.

Line [61] determines the method B.f( ) that will be invoked by the dynamic dispatch mechanism if virtual method A.f( ) is called on an object of type C. The mechanism for determining this method is language-dependent. In the case of Java, refer to J. Gosling, B. Joy, G. Steele, The Java Language Specification, Addison-Wesley, 1996. In the case of C++, refer to Accredited Standards Committee X3, Information Processing Systems, Working Paper for Draft Proposed International Standard for Information Systems—Programming Language C++, Doc. No. X3J16/97-0108. Draft of Nov. 25 1997.

Line [62] checks if B is a library class or if method B.f( ) occurs in processedMethods, currentMethods, or new- Methods. If this is not the case, B.f( ) is added to new-Methods (line [63]).

Procedure handleOverriddenLibraryMethods

The procedure handleOverriddenLibraryMethods (lines [68]–[80]) processes a set S of instantiated classes to determine any methods in those classes and their base classes that can be invoked by a dynamic dispatch from within a class library. Lines [70]–[79] describe a loop that iterates over each class C in S. Lines [71]–[78] describe a nested loop that iterates over each library class L from which this class C inherits. Preferably, the library classes from which class C inherits are generated by determining the superclasses of class C, and then identifying those superclasses that are library classes. Preferably, a list of library classes is provided by user input. In this case, the system can determine that a superclass of C that is library class if the superclass matches one of the library classes in the list of library classes. Lines[72]–[77] describe another nested loop that iterates over each virtual method f( ) in this class L that can be overridden by applications that use the library. The virtual methods for a given library class that can be overridden by applications that use the library is provided by the interface to the library L as described above. Note that lines [72]–[77] need not access nor analyze the body of each virtual method f( ) in class L.

Line[73] determines the method B.f( ) that will be invoked by the dynamic dispatch mechanism if method L.f( ) is called on an object of type C. The mechanism for determining this method is language-dependent. In the case of Java, refer to J. Gosling, B. Joy, G. Steele, The Java Language Specification, Addison-Wesley, 1996. In the case of C++, refer to Accredited Standards Committee X3, Information Processing Systems, Working Paper for Draft Proposed International Standard for Information Systems—Programming Language C++, Doc. No. X3J16/97-0108. Draft of Nov. 25 1997.

Line [74] checks if this class B is a library class (using list of Library classes), or if method B.f( ) occurs in processedMethods, currentMethods, or newMethods. If this is not the case, method B.f( ) is added to newMethods (line [75]).

It will now be discussed how the method described above determines a set of reachable methods for the program of FIG. 3. For the purposes of this example, it will be assumed that any call site and class instantiation that occurs in the body of a method is reachable (lines [41,46,51]).

The example program is analyzed by executing procedure findReachableMethods. It will now be shown how a set of reachable methods is determined by presenting the individual steps of the execution of the pseudo-code of FIGS. 4 and 5.

The initialization of the variables used as a worklist in the method proceeds as follows: In line [3] of the procedure findReachableMethods, variable processedClasses is initialized to the empty set. In line [4], variable currentClasses is initialized to the empty set. On line [5 ], variable newClasses is initialized to the empty set. In line [6], variable processedMethods is initialized to the empty set. In line [7], variable currentMethods is initialized to the set {C.main( )}. In line [8], variable newMethods is initialized to the empty set. In line [9], variable processedSignatures is initialized to the empty set. In line [10], variable currentSignatures is initialized to the empty set. In line [11], variable newSignatures is initialized to the empty set.

The first iteration of the procedure findReachableMethods proceeds as follows. Since currentMethods is not empty, the body of the while-loop on lines [12]–[35] is traversed. In the first iteration of the while-loop, C.main( ) is the only method that occurs in currentMethods. Consequently the execution of lines [13]–[15] results in a call to procedure processMethod for method {C.main( )}.

Execution of procedure processMethod for method {C.main( )} proceeds as follows. Method C.main( ) contains an instantiation of class B. Since class B does not occur in any of the sets processedClasses, currentClasses, or newClasses, execution of lines [42]–[44] adds class B to newClasses. Method C.main( ) contains a direct call to the constructor method B.B( ). Since this method does not occur in any of the sets processedMethods, currentMethods, or newMethods, execution of lines [46]–[50] adds method B.B( ) to newMethods. In addition, method C.main( ) contains a virtual call to methods L.f( ) and A.g( ). Method L.f( ) occurs in library class L and is hence not added to any of the worklists described above. Method A.g( ) occurs in an application class and does not occur in any of the sets processedSignatures, currentSignatures, or newSignatures. Therefore, execution of lines [51]–[55] results in the addition of A.g( ) to newSignatures. This completes the processing of all methods in currentMethods.

After completion of processing of all methods in currentMethods, execution continues at line [16]. In this iteration, the body of the loop on lines [16]–[18] is not traversed, because processedCallSites is empty. Similarly, the body of the loops on lines [19]–[21] and lines [22]–[24] are not traversed in this iteration because currentCallSites is empty.

Execution of line [25] results in a call to handleOverriddenLibraryMethods with the empty set as an argument. Execution of this procedure does not traverse the loop of lines [70]–[79] because the argument S to method handleOverriddenLibraryMethods is the empty set.

Upon return from procedure handleOverriddenLibraryMethods, execution of procedure findReachableMethods resumes at line [26]. Execution of line [26] does not affect the value of processedClasses because currentClasses is empty. Execution of line [27] adds class B to currentClasses. Execution of line [28] sets newClasses to the empty set. Execution of line [29] adds method C.main( ) to processedMethods. Execution of line [30] adds method B.B( ) to currentMethods. Execution of line [31] assigns the empty set to newMethods. Execution of line [32] does not affect processedSignatures. Execution of line [33] adds signature A.g( ) to currentSignatures. Execution of line [34] assigns the empty set to newSignatures.

This concludes the first iteration of the loop of lines [12]–[35] of procedure findReachableMethods. At the end of the first iteration, the values of the variables are as follows:

processedClasses=Ø
currentClasses={B}
processedMethods={C.main( )}
currentMethods={B.B( )}
processedSignatures=Ø
currentSignatures={A.g( )}

Note that the values of the variables newClasses, newMethods, and newSignatures are always empty at the end of an iteration.

The second iteration of the procedure findReachableMethods proceeds as follows. Since currentClasses, currentMethods and currentSignatures are non-empty, the loop on lines [12]–[35] is traversed again. Execution of the loop on lines [13]–[15] results in the invocation of procedure processMethod for all methods in currentMethods (i.e., B.B( )).

In procedure processMethod, it is determined that method B.B( ) contains a direct call to constructor A.A( ). Since A is not a library class, and A.A( ) does not yet occur in processedMethods, currentMethods, or newMethods (line [47]), A.A( ) is added to newMethods (line [48]).

Since processedSignatures is empty, the body of the loop on lines [16]–[18] is not traversed in this iteration. Since currentSignatures contains a single signature, A.g( ), the body of the loop on lines [19]–[21] is traversed once, and procedure processCallSite is called with arguments A.g( ) and ∅. The body of the main loop of procedure processCallSite is not traversed because variable S (bound to processedClasses) is empty.

Since currentSignatures contains a single signature, A.g( ), the body of the loop on lines [22]–[24] is also traversed once, and procedure processCallSite is called with arguments A.g( ) and {B}. This time, the body of the loop on lines [59]–[66] is traversed once because set S contains a single element B. Line [60] verifies if class C (bound to B) is derived from class A (bound to A). Since this is the case, lines [61]–[64] are executed. Line [61] determines that a dynamic dispatch for method A.g( ) on an object of type B resolves to method B.g( ). Since B is not a library class, and method B.g( ) does not yet occur in processedMethods, currentMethods, or newMethods (line [62]), B.g( ) is added to newMethods (line [63]). This concludes the execution of procedure processCallSite.

Execution of procedure findReachableMethods resumes at line [25], with an invocation of procedure handleOverriddenLibraryMethods with class B as an argument. The loop on lines [70]–[79] of procedure handleOverriddenLibraryMethods is executed once, with variable C bound to B. The loop on lines [71]–[78] is executed once, with variable L bound to L because L is the sole library class from which B inherits. The loop on lines [72]–[77] is executed for each of the methods L.f( ) and L.h( ). The first iteration of this inner loop proceeds as follows. On line [73] method L.f( ) is determined to be the method that a virtual dispatch on method L.f( ) resolves to for an object of type B. Since this method occurs in a library class, the condition on line [74] evaluates to false, and line [75] is not executed. In the second iteration of the inner loop, method B.h( ) is determined to be the method that a virtual dispatch on method L.h( ) resolves to for an object of type B. Since this method occurs in a non-library class, and it does not occur yet in any of the sets processedMethods, currentMethods, or newMethods, the condition on line [74] evaluates to true, and B.h( ) is added to newMethods (line [75]). This concludes the execution of procedure handleOverriddenLibraryMethods.

Execution of procedure findReachableMethods resumes on line [26]. Line [26] adds B to processedClasses. Line [27] assigns the empty set to currentClasses. Line [28] assigns the empty set to newClasses. Line [29] adds method B.B( ) to processedMethods. Line [30] adds methods A.A( ), B.g( ), and B.h( ) to currentMethods. Line [31] assigns the empty set to newMethods. Line [32] adds A.g( ) to processedSignatures. Line [33] does not affect the value of currentSignatures, because newSignatures is empty. Line [34] assigns the empty set to newSignatures.

At the end of the second iteration, the values of the variables are as follows:

processedClasses={B}
currentClasses=∅
processedMethods={C.main( ), B.B( )}
currentMethods={A.A( ), B.g( ), B.h( )}
processedSignatures={A.g( )}
currentSignatures=∅

The third iteration of the procedure findReachableMethods proceeds as follows. Since currentMethods is non-empty, the loop on lines [12]–[35] is traversed again.

Execution of the loop on lines [13]–[15] results in the invocation of procedure processMethod for all three methods in currentMethods (i.e., A.A( ), B.g( ), and B.h( )). In the course of processing method A.A( ), a direct call to constructor L.L( ) is encountered. Since this method occurs in a library class, it is not added to newMethods. Method B.g( ) does not contain any class instantiation sites, or direct or virtual calls. Hence, none of the variables are affected while processing this method. Processing method B.h( ) leads to the identification of a virtual call to method B.k( ). Hence, B.k( ) is added to newSignatures. Next, the loop on lines [16]–[18] is executed. This results in a single call to procedure processCallSite with the arguments A.g( ) and the empty set. Since the latter argument is the empty set, the main loop of procedure processCallSite is not traversed, and no variables are affected.

Since currentSignatures is empty, the loops of lines [19]–[21] and lines [22]–[24] are not traversed. Execution of line [25] results in a call to handleOverriddenLibraryMethods with the empty set as an argument. Hence, the main loop of handleOverriddenLibraryMethods is not traversed. Execution of line [26] does not affect processedClasses. Line [27] assigns the empty set to currentClasses. Line [28] assigns the empty set to newClasses. Line [29] adds methods A.A( ), B.g( ) and B.h( ) to processedMethods. Line [30] assigns the empty set to currentMethods. Line [31] assigns the empty set to newMethods. Line [32] does not affect processedSignatures. Line [33] adds B.k( ) to currentSignatures. Line [34] assigns the empty set to newSignatures.

At the end of the third iteration, the values of the variables are as follows:

processedClasses={B}
currentClasses=∅
processedMethods={C.main( ), B.B( ), A.A( ), B.g( ), B.h( )}
currentMethods=∅
processedSignatures={A.g( )}
currentSignatures={B.k( )}

The fourth iteration of the procedure findReachableMethods proceeds as follows. Since currentSignatures is non-empty, the loop on lines [12]–[35] is traversed again. Since currentMethods is empty, the body of the loop on lines [13]–[15] is not traversed.

Next, the loop on lines [16]–[18] is executed. This results in a single call to procedure processCallSite with the arguments A.g( ) and the empty set. Since the latter argument is the empty set, the main loop of procedure processCallSite is not traversed, and no variables are affected.

Because currentSignatures contains a single element, B.k( ), the body of the loop on lines [19]–[21] is traversed once, and procedure processCallSite is invoked with arguments B.k( ) and B. As a result, the loop on lines [59]–[66] is traversed once, with variable C bound to class B and variable A also bound to class B. Consequently, the condition on line [60] evaluates to true, and lines [61]–[64] are executed. Execution of line [61] determines that a virtual call to B.k( ) on an object of type B resolves to method B.k( ). Since B is not a library class, and B.k( ) does not yet occur in processedMethods, currentMethods, or newMethods (line [62]), method B.k( ) is added to newMethods.

Execution resumes at line [22], resulting in a call to method processCallSite with arguments B.k( ) and the empty set. Hence, the main loop on procedure processCallSite is not executed, and no variables are affected.

Execution of line [25] results in a call to handleOverriddenLibraryMethods with the empty set as an argument. Hence, the main loop of handleOverriddenLibraryMethods is not traversed.

Execution of line [26] does not affect processedClasses. Line [27] assigns the empty set to currentClasses. Line [28] assigns the empty set to newClasses. Line [29] does not affect processedMethods. Line [30] adds method B.k( ) to currentMethods. Line [31] assigns the empty set to newMethods. Line [32] adds B.k( ) to processedSignatures. Line [33] assigns the empty set to currentSignatures. Line [34] assigns the empty set to newSignatures.

At the end of the fourth iteration, the values of the variables are as follows:

processedClasses={B}
currentClasses=Ø
processedMethods{C.main( ), B.B( ), A.A( ), B.g( ), B.h( )}
currentMethods={B.k( )}
processedSignatures={A.g( ), B.k( )}
currentSignatures=Ø

The fifth iteration of the procedure findReachableMethods proceeds as follows. Since currentMethods is non-empty, the loop on lines [12]–[35] is traversed again.

Execution of the loop on lines [13]–[15] results in the invocation of procedure processMethod for method B.k( ). Method B.k( ) does not contain any class instantiation sites, or direct or virtual calls. Hence, none of the variables are affected while processing this method.

Since processedSignatures is empty, the body of the loop on lines [16]–[18] is not traversed in this iteration.

The body of the loops on lines [19]–[21] and lines [22]–[24] are not traversed in this iteration because currentCallSites is empty.

Execution of line [25] results in a call to handleOverriddenLibraryMethods with the empty set as an argument. Execution of this procedure does not traverse the loop of lines [70]–[79] because the argument S to method handleOverriddenLibraryMethods is the empty set.

Execution of line [26] does not affect processedClasses. Line [27] assigns the empty set to currentClasses. Line [28] assigns the empty set to newClasses. Line [29] adds B.k( ) to processedMethods. Line [30] assigns the empty set to currentMethods. Line [31] assigns the empty set to newMethods. Line [32] does not affect processedSignatures. Line [33] assigns the empty set to currentSignatures. Line [34] assigns the empty set to newSignatures.

At the end of the fifth iteration, the values of the variables are as follows:

processedClasses={B}
currentClasses=Ø
processedMethods={C.main( ), B.B( ), A.A( ), B.g( ), B.h( ), B.k( )}
currentMethods=Ø
processedSignatures={A.g( ), Bk( )}
currentSignatures=Ø

At the end of the fifth iteration of the procedure findReachableMethods, the sets currentClasses, currentMethods, and currentSignatures are all empty, and the loop on lines [12]–[35] is exited, and execution proceeds at line [36]. Line [36] assigns the set of methods in processedMethods (i.e., {C.main( ), B.B( ), A.A( ), B.g( ), B.h( ), B.k( )}) to variable liveMethodDefinitions, indicating that these methods are reachable. Furthermore, line [37] assigns the set of methods that lie outside the intersection of processedMethods and processedSignatures (i.e., {A.g( )}) to variable liveMethodSignatures, indicating that these signatures are reachable, and that these signatures are needed in order to correctly execute virtually dispatched method calls in the program.

While the description above has relied on the class hierarchy and instantiated classes in order to resolve virtually dispatched method calls, the method can easily be adapted to use only class hierarchy information. In addition, techniques for determining pointer aliases can be used to resolve virtual method calls (See, e.g., H. D. Pande and B. G. Ryder, "Data-flow-based Virtual Function Resolution," Proceedings of the Third International Symposium on Static Analysis (SAS'96), Springer-Verlag Lecture Notes in Computer Science, Volume 1145, pages 238–254, September 1996; and B. Steensgaard, "Points-to Analysis in almost linear time," Proceedings of the 23rd ACM Symposium on Principles of Programming Languages (POPL'97), St. Petersburg, Fla., January 1996, pp. 32–41.

The technique of the present invention may be used by a tool to reduce the size of a program's representation. A tool accepts as an input a source program and operates on it to generate as an output a more efficient (yet functionally equivalent) representation of the source program. The tool typically includes functionality that parses and performs semantic analysis on the source program to identify the object oriented features of the source program as described herein. A more detailed description of such a tool is described in F. Tip, C. Laffra, P. F. Sweeney, D. Streeter, "Size Matters: Reducing the Size of Java Class File Archives," IBM Technical Report, RC 21321, IBM T. J. Watson Research Center, October 1998, herein incorporated by reference in their entirety. In such a tool, the methodology described above may be used to identify a set of reachable methods of the program. The methods of the source program that are not included in this set may be excluded from the representation of the source program output by the tool, which reduces the size of the program's representation. In addition, the methodology described above may be used to identify a set of methods of the source program whose signature is required for execution of the program yet whose body is not required for the execution of the program. For these methods, the body is preferably replaced by one or more statements that satisfy the type-checking requirements of the language (such as a return statement) such that compilation of the program does not result in an error and the size of the program's representation is reduced.

The representation output by the tool may be source code, which is compiled to thereby generate a run-time representation of the source program. In the alternative, the representation output by the tool may be an intermediate representation of the source program, which is transformed by the back-end processing stage of a compiler to thereby generate a run-time representation of the source program. The executable code generated by the back-end processing stage of a compiler is a run-time representation of the source program and is typically compatible with a specific computer architecture, for example the Windows®-Intel® architecture or a virtual machine architecture such as the architecture specified for the JAVA™ virtual machine.

In an alternate embodiment, the techniques of the present invention may be used by such a tool to transform virtual calls into direct calls. More specifically, the methodology of the present invention as described above may be applied to an input program that uses methods in a class library to identify a set of reachable methods in the input program. The tool then identifies the virtual function call sites in the input program. For each virtual call to a method, denoted method f( ), the tool determines if the set of reachable methods contains only one method with the same signature as the method f( ). If so, the tool replaces the semantics of the virtual call to method f( ) with a direct call to method f( ), which improves the efficiency of executing the program when the method f( ) is invoked.

The constitutions and functions of these elements are well known in the art and will not be otherwise described here. For example, further description on the various functionality of the tool and/or compiler described above may be found in A. V. Aho et al., "Compilers Principles, Techniques and Tools, Addison-Wesley, 1986, herein incorporated by reference in its entirety.

In another embodiment, the representation output of the tool may be compressed to form an archive file, such as a zip file or jar file. This further reduces the size of the program's representation, which is advantageous when transmitting the program over a low bandwidth communication link.

The technique of the present invention may also be integrated into an application for program understanding and debugging. More specifically, the methodology described above may be applied to an input program that uses methods in a class library to identify one or more of the following elements without analysis of the code in the library:

i) the methods of the input program that are reachable;
ii) the methods of the input program that are not-reachable;
iii) the methods of the input program whose signature is required for execution of the program yet whose body is not required for the execution of the program. The identified element(s) are then reported to the user via the display device 38 or other user interface device for program understanding purposes or debugging purposes.

While the invention has been described above with respect to particular embodiments thereof, those skilled in the art will recognize that the invention can be practiced with modification within the spirit and scope of the appended claims.

We claim:

1. A method for determining reachable methods in an object-oriented program which includes virtual method calls and which uses a class library having an interface, the method comprising the steps of:
    identifying a first set containing initially reachable methods in the object-oriented program;
    for a given method in the object-oriented program that is reachable, including any of the initially reachable methods contained in the first set, identifying a second set containing calls reachable in the given method, and identifying a third set containing classes instantiated in the given method;
    for a given call in the second set, identifying a fourth set containing methods in the program reachable by a dynamic dispatch from the given call; and
    for a given class in the object-oriented program that is instantiated and that comprises any methods that override a method in the class library, identifying a fifth set containing methods of the given class reachable by a dynamic dispatch within the class library based on the interface.

2. The method according to claim 1, wherein said step of identifying the first set comprises the step of identifying a main method of the object-oriented program.

3. The method according to claim 1, wherein said step of identifying the first set comprises the steps of identifying initialization methods for at least one of statically scoped variables and globally scoped variables.

4. The method according to claim 1, wherein said step of identifying the second set comprises the step of identifying all calls in the given method as reachable, when the given method is reachable by a static call or a dynamic call.

5. The method according to claim 1, wherein said step of identifying the second set comprises the step of analyzing data flow to or from calls in the given method.

6. The method according to claim 1, wherein said step of identifying the second set comprises the step of excluding calls in methods corresponding to a library class from the second set.

7. The method according to claim 1, wherein said step of identifying the third set comprises the step of identifying all classes instantiated in the given method as reachable, when the given method is reachable by a static call or a dynamic call.

8. The method according to claim 1, wherein said step of identifying the third set comprises the step of excluding classes in methods corresponding to a library class from the third set.

9. The method according to claim 1, wherein said step of identifying the fifth set further comprises the step of identifying methods of base classes corresponding to the given class reachable by the dynamic dispatch within the library based on the interface.

10. The method according to claim 1, wherein said step of identifying the fifth set comprises the step of determining library classes from which the given class inherits.

11. The method according to claim 10, wherein said step of determining the library classes from which the given class inherits comprises the steps of:
    determining superclasses of the given class; and
    identifying the superclasses that are the library classes.

12. The method according to claim 11, wherein said step of identifying the superclasses that are the library classes comprises the steps of:
    receiving a list of library classes;
    comparing the determined superclasses to the list of library classes; and
    identifying a superclass of the given class as a library class, when the superclass matches the library class in the list of library classes.

13. The method according to claim 1, further comprising the step of iteratively repeating said step of identifying the second set, the third set, the fourth set, and the fifth set, until all reachable calls, classes, and methods have been identified.

14. The method according to claim 1, further comprising the step of excluding any methods of the object oriented program not included in any of the first set, the second set, the third set, the fourth set, and the fifth set from a representation of the object oriented program.

15. A program storage device readable by machine, tangibly embodying a program of instructions readable by the machine to perform method steps for determining reachable methods in an object-oriented program which includes virtual method calls and which uses a class library having an interface, said method steps comprising:
    identifying a first set containing initially reachable methods in the object-oriented program;

for a given method in the object-oriented program that is reachable, including any of the initially reachable methods contained in the first set, identifying a second set containing calls reachable in the given method, and identifying a third set containing classes instantiated in the given method;

for a given call in the second set, identifying a fourth set containing methods in the program reachable by a dynamic dispatch from the given call; and for a given class in the object-oriented program that is instantiated and that comprises any methods that override a method in the class library, identifying a fifth set containing methods of the given class reachable by a dynamic dispatch within the class library based on the interface.

16. The program storage device according to claim 15, wherein said step of identifying the first set comprises the step of identifying a main method of the object-oriented program.

17. The program storage device according to claim 15, wherein said step of identifying the first set comprises the steps of identifying initialization methods for at least one of statically scoped variables and globally scoped variables.

18. The program storage device according to claim 15, wherein said step of identifying the second set comprises the step of identifying all calls in the given method as reachable, when the given method is reachable by a static call or a dynamic call.

19. The program storage device according to claim 15, wherein said step of identifying the second set comprises the step of analyzing data flow to or from calls in the given method.

20. The program storage device according to claim 15, wherein said step of identifying the second set comprises the step of excluding calls in methods corresponding to a library class from the second set.

21. The program storage device according to claim 15, wherein said step of identifying the third set comprises the step of identifying all classes instantiated in the given method as reachable, when the given method is reachable by a static call or a dynamic call.

22. The program storage device according to claim 15, wherein said step of identifying the third set comprises the step of excluding classes in methods corresponding to a library class from the third set.

23. The program storage device according to claim 15, wherein said step of identifying the fifth set further comprises the step of identifying methods of base classes corresponding to the given class reachable by the dynamic dispatch within the library based on the interface.

24. The program storage device according to claim 15, wherein said step of identifying the fifth set comprises the step of determining library classes from which the given class inherits.

25. The program storage device according to claim 24, wherein said step of determining the library classes from which the given class inherits comprises the steps of:
  determining superclasses of the given class; and
  identifying the superclasses that are the library classes.

26. The program storage device according to claim 25, wherein said step of identifying the superclasses that are the library classes comprises the steps of:
  receiving a list of library classes;
  comparing the determined superclasses to the list of library classes; and
  identifying a superclass of the given class as a library class, when the superclass matches the library class in the list of library classes.

27. The program storage device according to claim 15, further comprising the step of iteratively repeating said step of identifying the second set, the third set, the fourth set, and the fifth set, until all reachable calls, classes, and methods have been identified.

28. The program storage device according to claim 15, further comprising the step of excluding any methods of the object oriented program not included in any of the first set, the second set, the third set, the fourth set, and the fifth set from a representation of the object oriented program.

29. A method for determining reachable methods in an object-oriented program which includes virtual method calls and which uses a class library having an interface, the method comprising the steps of:
  identifying a first set containing initially reachable methods in the object-oriented program, the first set containing at least a main method of the object-oriented program and any initialization methods for statically scoped or globally scoped variables;
  for a given method in the object-oriented program that is reachable, including any of the initially reachable methods contained in the first set, identifying a second set containing calls reachable in the given method, and identifying a third set containing classes instantiated in the given method;
  for a given call in the second set, identifying a fourth set containing methods in the program reachable by a dynamic dispatch from the given call;
  for a given class in the object-oriented program that is instantiated and that comprises any methods that override a method in the class library, identifying a fifth set containing methods of the given class reachable by a dynamic dispatch within the class library based on the interface; and
  excluding any methods of the object oriented program not included in any of the first set, the second set, the third set, the fourth set, and the fifth set from a representation of the object oriented program.

* * * * *